United States Patent
Choi

(10) Patent No.: US 7,495,893 B2
(45) Date of Patent: Feb. 24, 2009

(54) PORTABLE COMPUTER

(75) Inventor: Jae-chun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 11/485,445

(22) Filed: Jul. 13, 2006

(65) Prior Publication Data

US 2007/0070592 A1 Mar. 29, 2007

(30) Foreign Application Priority Data

Aug. 19, 2005 (KR) .................... 10-2005-076428

(51) Int. Cl.
*H05K 5/00* (2006.01)
*H05K 7/00* (2006.01)
*G06F 1/16* (2006.01)
*H01R 13/64* (2006.01)
*H01R 31/06* (2006.01)
*H01R 24/00* (2006.01)

(52) U.S. Cl. .................... 361/680; 361/683; 439/248; 439/626; 439/628; 439/629; 439/630; 439/631; 439/632

(58) Field of Classification Search ................ 361/680, 361/683; 439/248, 626, 628–632
See application file for complete search history.

(56) References Cited

U.S. PATENT DOCUMENTS 3,723,673 A * 3/1973 Clary et al. .................. 200/1 R
4,425,484 A * 1/1984 Fukukura .................... 200/5 A
5,061,830 A * 10/1991 Ambrose ..................... 200/5 A
5,331,508 A * 7/1994 Hosoi et al. .................. 361/680
5,715,139 A * 2/1998 Nakajima .................... 361/683

(Continued)

FOREIGN PATENT DOCUMENTS

JP   2002-99371   4/2002

(Continued)

OTHER PUBLICATIONS

KR Office Action dated Sep. 13, 2006 issued in KR 2005-76428.

*Primary Examiner*—Jayprakash N Gandhi
*Assistant Examiner*—Anthony M Haughton
(74) *Attorney, Agent, or Firm*—Stanzione & Kim, LLP

(57) ABSTRACT

A portable computer includes a main body, a keyboard assembly and an interface unit. The main body has a main circuit substrate received in the main body and a main body connector. The interface unit has a plurality of signal pads and a plurality of groups of branch pads split from an end of a line extended from each signal pad into a plurality of branches. The keyboard assembly has a plurality of keyboard signal pins connected to one of either each of the branch pads of each group or the signal pad, and a main body cable unit of which one side is provided with a cable connector connected to the main body connector, and the other side is provided with main body signal pins connected to the other of either each of the branch pads of each group or the signal pad. The portable computer having the keyboard assembly and the main circuit substrate can adaptively correspond to variation of a construction of the keyboard assembly or a layout change of the main circuit substrate received in the main body by connecting through the interface unit.

20 Claims, 5 Drawing Sheets

U.S. PATENT DOCUMENTS

| | | | |
|---|---|---|---|
| 5,717,565 A | 2/1998 | Raasch | |
| 5,774,329 A * | 6/1998 | Kuo | 361/680 |
| 6,101,088 A * | 8/2000 | Nakajima et al. | 361/686 |
| 6,181,262 B1 * | 1/2001 | Bennett | 341/26 |
| 6,595,786 B2 * | 7/2003 | Horiuchi et al. | 439/74 |
| 6,629,851 B1 * | 10/2003 | Kikuchi et al. | 439/79 |
| 6,783,926 B2 | 8/2004 | Reece | |
| 6,894,906 B2 * | 5/2005 | Sivertsen | 361/796 |
| 7,265,969 B2 * | 9/2007 | Jin | 361/680 |
| 2002/0007198 A1 * | 1/2002 | Haupert et al. | 607/30 |
| 2005/0018391 A1 * | 1/2005 | Jin | 361/680 |
| 2006/0002065 A1 * | 1/2006 | Hua | 361/683 |
| 2007/0019373 A1 * | 1/2007 | Yokote | 361/683 |
| 2007/0236459 A1 * | 10/2007 | Kohlman et al. | 345/168 |

FOREIGN PATENT DOCUMENTS

KR   2004-66647   7/2004

* cited by examiner

120# PORTABLE COMPUTER

CROSS-REFERENCE TO RELATED APPLICATIONS

This application claims priority from Korean Patent Application No. 2005-0076428, filed on Aug. 19, 2005, in the Korean Intellectual Property Office, the disclosure of which is incorporated in its entirety herein by reference.

BACKGROUND OF THE INVENTION

1. Field of the Invention

The present general inventive concept relates to a portable computer, and more particularly, to a portable computer to minimize a variation according to the change of a layout of a main circuit substrate or a construction of a keyboard assembly received in a main body thereof.

2. Description of the Related Art

FIG. 1 is an exploded prospective view illustrating a conventional portable computer 100. Referring to FIG. 1, the conventional portable computer 100 includes a main body 110, a display 120 such as an LCD(Liquid Crystal Display) for displaying an image, and a keyboard assembly 130 installed on an upper surface of the main body 110.

A main circuit substrate 115 such as a main board on which parts such as a CPU (Central Processing Unit) or a RAM (Random Access Memory) are mounted, is received in the main body 110.

The display 120 receives an image signal from the main body 110 to display the image thereon. The display 120 and the main body 110 are connected to each other via a cable (not shown). Here, the display 120 is pivotally connected to the main body 110, and can be maintained in a folded status while not in use.

The keyboard assembly 130 as an input device supplies a key signal to the main circuit substrate 115. A keyboard circuit substrate (not shown) is received in the keyboard assembly 130, and it generates the key signal under the operation of a user.

The keyboard circuit substrate of the keyboard assembly 130 and the main circuit substrate 115 are connected to each other via a cable such as an FPC (Flexible Printed Circuit) 133. For example, one side of the FPC 133 is connected to the keyboard circuit substrate of the keyboard assembly 130, and the other side is provided with a keyboard connector 134. The keyboard connector 134 provided to the other side of FPC 133 is connected to a main body connector 115a provided in the main circuit substrate 115 to thereby transfer the key signal from the keyboard assembly 130 to the main circuit substrate 115.

In the conventional portable computer 100, the FPC 133, a combining portion of the keyboard circuit substrate of the keyboard assembly 130 and the FPC 133, and the main body connector 115a of the main circuit substrate 115 are aligned to be positioned on a same line A-A, when the keyboard assembly 130 is combined to the main body 110. Otherwise, the connection of both combining portions of the FPC 133 can become defective due to bending of the FPC 133.

Accordingly, in a case that a mount position of the main connector 115a is changed in a right or left direction due to an upgrade of a product or a change of a layout of the main circuit substrate 115 for mounting chips, a design of keyboard assembly 130 should also be changed accordingly.

The same problem can also occur in a case that a position where the FPC 133 is combined to the keyboard circuit substrate of the keyboard assembly 130, and the mount position of the main connector 115a is varied.

SUMMARY OF THE INVENTION

The present general inventive concept provides a portable computer in which a combining portion of a keyboard assembly and a main circuit substrate can adaptively correspond to a variation of a construction of the keyboard assembly or a layout change of the main circuit substrate received in a main body.

Additional features of the general inventive concept will be set forth in the description which follows, and in part will be apparent from the description, or may be learned by practice of the general inventive concept.

The foregoing and/or other aspects and utilities of the present general inventive concept may be achieved by providing a portable computer having a main body, and a main circuit substrate received in the main body and provided with a main body connector, the portable computer comprising an interface unit having a plurality of signal pads, a plurality of signal lines extended from the respective signal pads, and a plurality of groups connected to the respective signal lines, and a plurality of branch pads split from each of the plurality of groups to form a plurality of branches of each end of the signal lines, a keyboard assembly having a plurality of keyboard signal pins connected to one of either one of the branch pads of each group or the signal pads; and a main body cable unit of which one side is provided with a cable connector connected to the main body connector, and the other side is provided with main body signal pins connected to the other of either one of the branch pads of each group or the signal pad not connected to the keyboard signal pins.

The signal pads may be spaced apart from one another by a first predetermined interval along a first edge of the interface unit parallel to an edge of the keyboard assembly, and the branch pads are arranged spaced apart from each other by a second predetermined interval along a second edge of the interface unit opposite to the first edge.

The branch pads in each the plurality of groups may be arranged to be spaced from each other at same intervals.

The keyboard signal pin and/or the main body signal pin are soldered to the signal pads and/or the branch pads.

The foregoing and/or other aspects and utilities of the present general inventive concept may also be achieved by providing a portable computer having a main body, and a main circuit substrate received in the main body and provided with a main body connector, the portable computer comprising an interface unit having a plurality of signal lines, a plurality of first groups connected to a first end of the respective signal lines, a plurality of first branch pads split from, each of the first groups to form a plurality of first branches, and a plurality of second groups connected to a second end of the respective signal lines, a plurality of second branch pads split from each of the second groups to form a plurality of second branches, a keyboard assembly provided with a plurality of keyboard signal pins connected to one of the first branch pads of each first group, and a main body cable unit of which one side is provided with a cable connector connected to the main body connector, and the other side is provided with a plurality of main body signal pins connected to one of the second branch pads of each second group.

The first branch pads may be arranged to be spaced from each other at a first predetermined interval along a first edge of the interface unit opposite to an edge of the keyboard assembly; and the second branch pads are arranged to be spaced from each other at a second predetermined interval along a second edge of the interface unit opposite to the first edge.

The first branch pads in each group may be arranged to be spaced from each other in a same interval; and the second branch pads in each group are arranged to be spaced from each other in the same interval.

The keyboard signal pin and/or the main body signal pin may be soldered to the branch pads of the first and/or the second group.

The foregoing and/or other aspects and utilities of the present general inventive concept may also be achieved by providing a portable computer, comprising a keyboard having a keyboard cable, a main circuit substrate having a main body connector to be connected to the keyboard cable, and an interface unit to connect the main body connector to the keyboard cable when a position of the keyboard cable is not aligned in a same line with a position of the main body connector.

The foregoing and/or other aspects and utilities of the present general inventive concept may also be achieved by providing an interface apparatus to electrically connect first and second components in a portable computer, the interface apparatus comprising a plurality of signal lines, signal pads formed on first ends of the signal lines to be connected to a first cable, and groups formed on second ends of the signal lines, each group having a first signal pad and a second signal pad one of which is connected to a second cable according to a position of the second cable with respect to the first cable.

BRIEF DESCRIPTION OF THE DRAWINGS

The above and/or other aspects and advantages of the prevent general inventive concept will become apparent and more readily appreciated from the following description of the exemplary embodiments, taken in conjunction with the accompany drawings, in which.

DETAILED DESCRIPTION OF THE PREFERRED EMBODIMENTS

Figure 1:
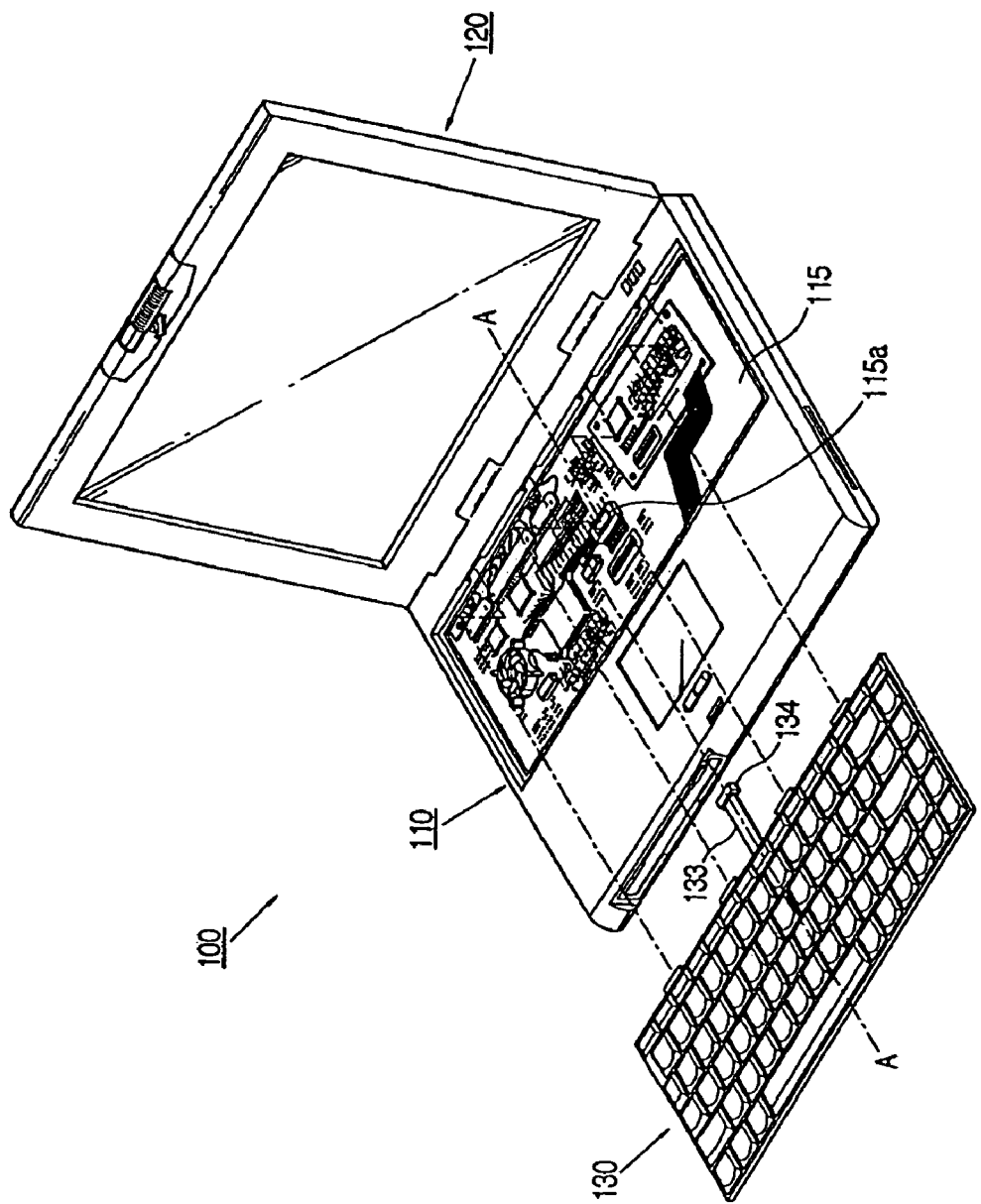
FIG. 1 is an exploded prospective view illustrating a conventional portable computer.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 2:
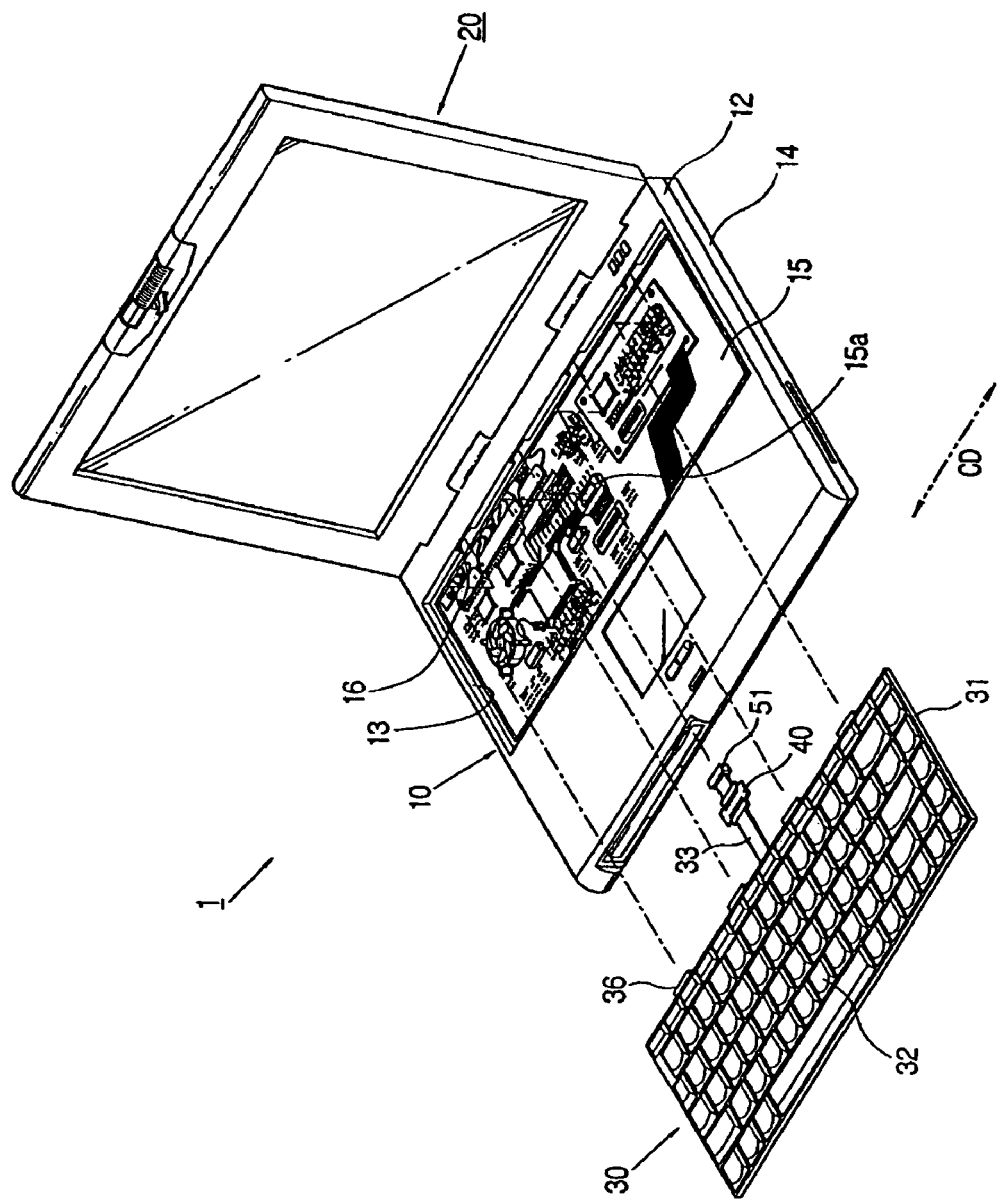
FIG. 2 is an exploded prospective view illustrating a portable computer according to an embodiment of the present general inventive concept.

FIG. 2 is an exploded prospective view illustrating a portable computer 1 according to an embodiment of the present general inventive concept. Referring to FIG. 2, the portable computer 1 may include a main body 10, a display 20, and a keyboard assembly 30.

The display 20 receives an image signal from the main body 10 to display an image thereon. The display 20 and main body 10 are connected to each other via a cable (not shown). Here, the display 20 is pivotably connected to the main body 10, and can be maintained in a folded status while not in use.

The main body 10 may include an upper casing 12 having a keyboard accommodating part 13 to install the keyboard assembly 30 therein, and a lower casing 14 combined to the upper casing 12 to thereby form a receiving space between the upper casing 12 and the lower casing 14.

A main circuit substrate 15, such as a main board on which parts such as a CPU (central processing unit) or RAM (random access memory) are mounted, is received in the receiving space of the main body 10. The main circuit substrate 15 is provided with a main body connector 15a electrically connected to the keyboard assembly 30.

The keyboard accommodating part 13 is formed by cutting away a plate surface of the upper casing 12 to correspond to a shape of a plate surface of the keyboard assembly 30, so that the keyboard assembly 30 is installed therein. The keyboard assembly 30 can be mounted to the main body 10 in a manner of inserting a fixing protrusion 36 projected from an end of one side thereof into a fixing aperture 16 formed in the keyboard accommodating part 13 of the main body 10. In addition, the keyboard assembly 30 may also be mounted to the keyboard accommodating part 13 formed on the main body 10 by various forms of fastening units such as a screw, hook, etc.

The keyboard assembly 30 may include a keyboard circuit substrate (not shown) to generate a key signal corresponding to an operation of a user, a keyboard casing 31 o receive the keyboard circuit substrate, and a keyboard 32 provided on an upper side of the keyboard casing 31.

Figure 3:
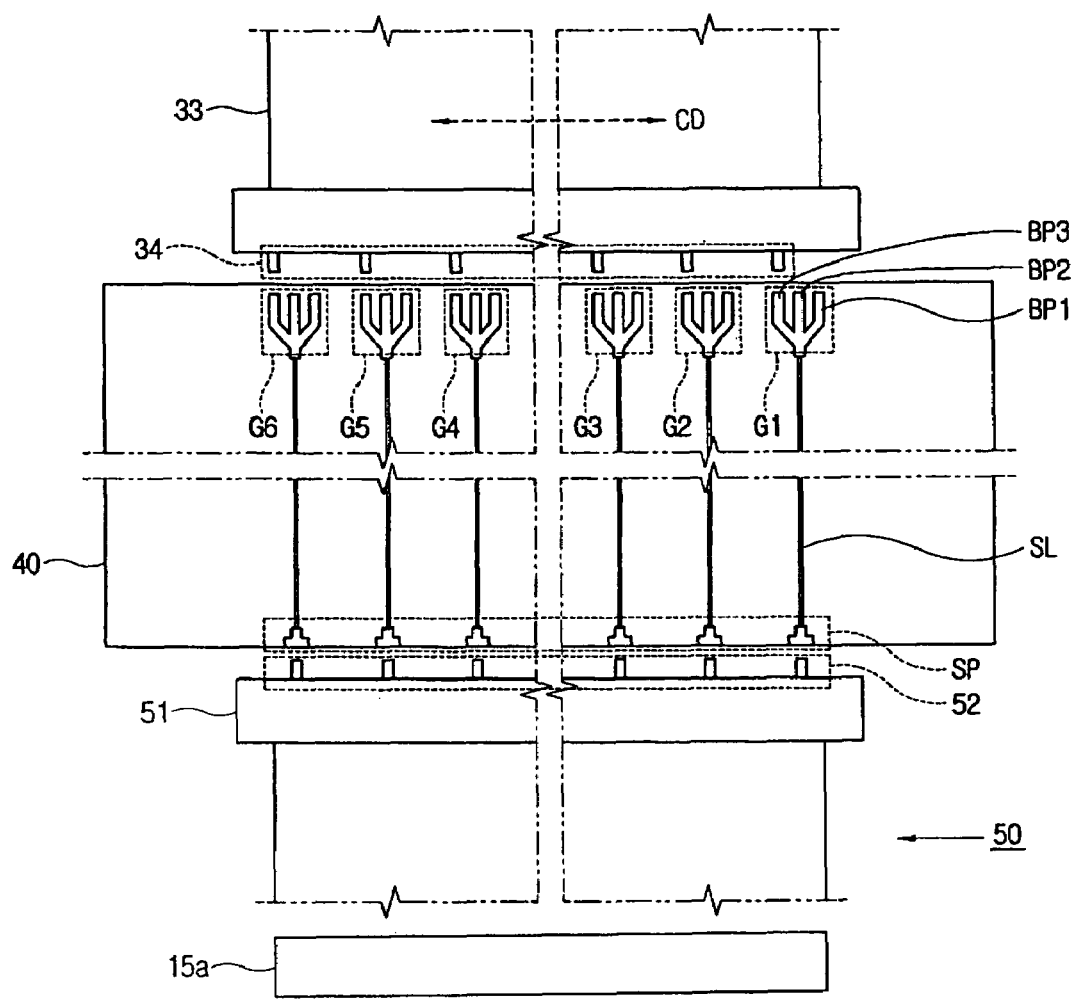
FIG. 3 is a view illustrating an interface unit of a portable computer according to an embodiment of the present general inventive concept.

In addition, the keyboard assembly 30 may include a keyboard cable 33 in the form of a flexible printed circuit (FPC), of which one side is connected to the keyboard circuit substrate, and the other side is provided with a plurality of keyboard signal pins 34 (FIG. 3).

Figure 4:
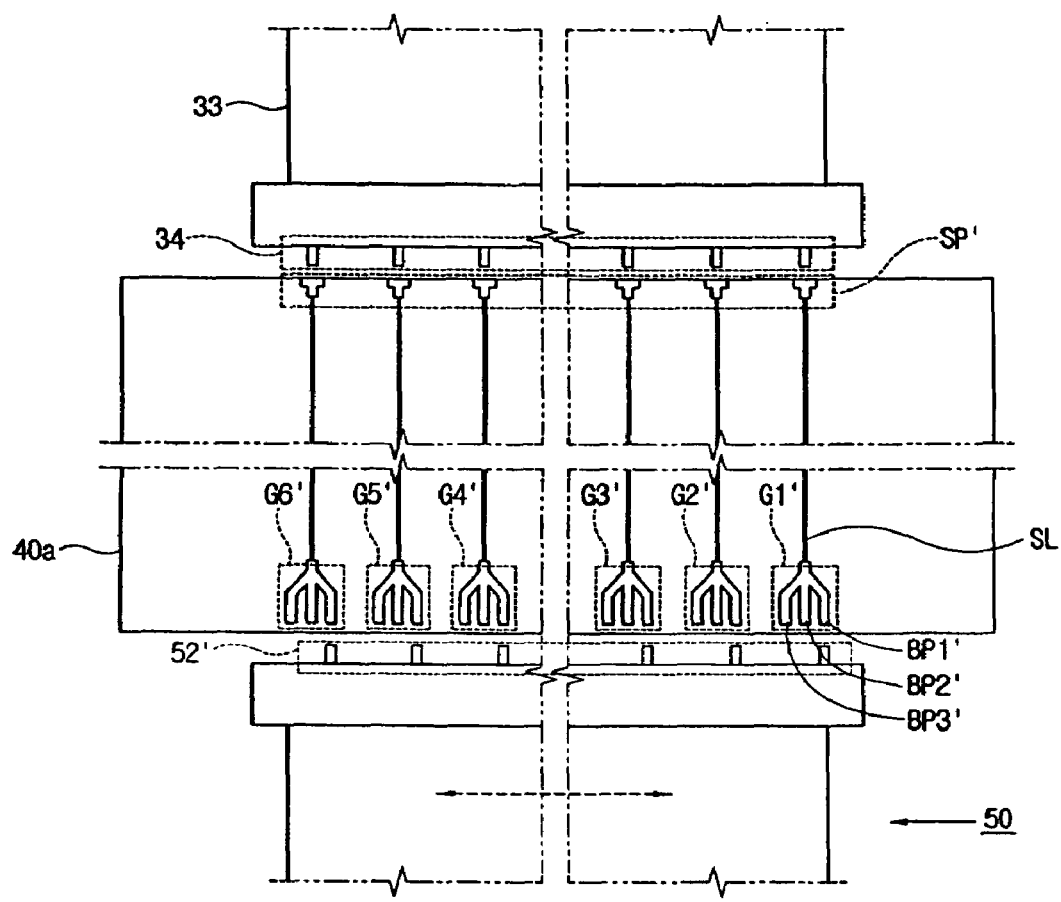
FIG. 4 is a view illustrating an interface unit of a portable computer according to an embodiment of the present general inventive concept.
Figure 5:
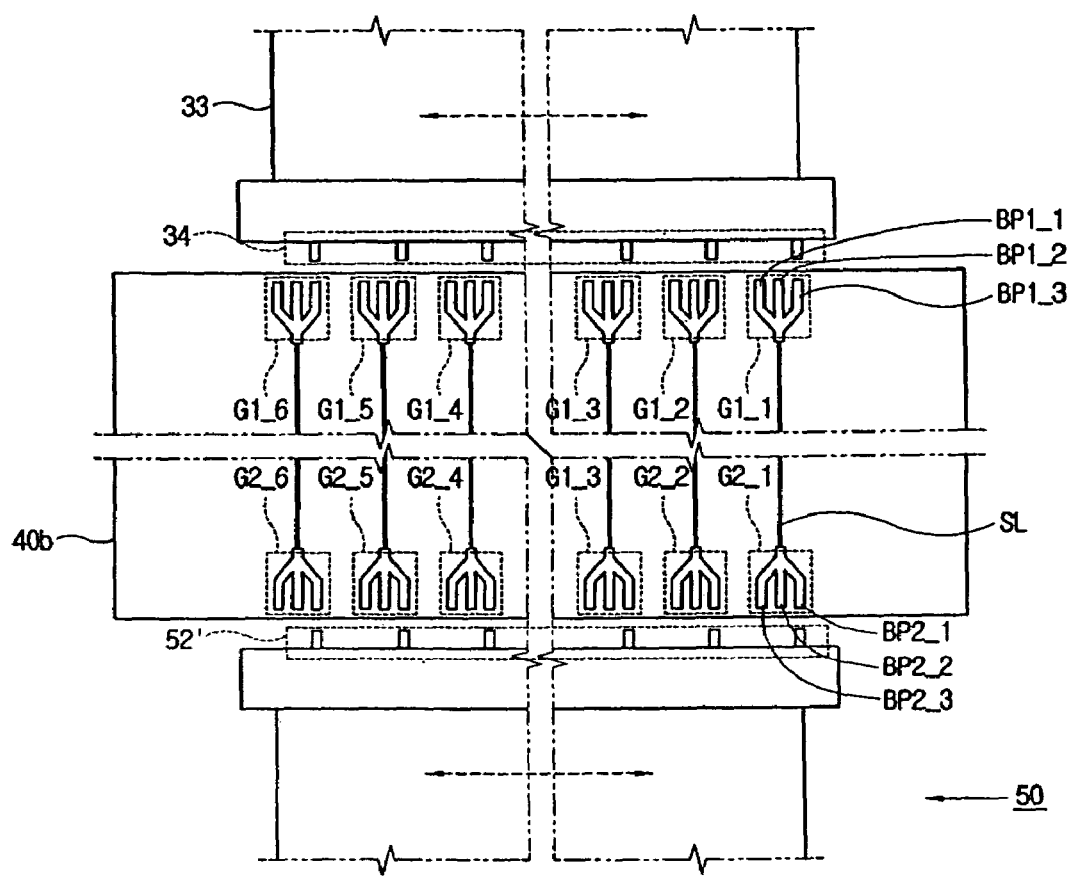
FIG. 5 is a view illustrating an interface unit of a portable computer according to an embodiment of the present general inventive concept.

FIGS. 3-5 are views illustrating an interface unit 40 of the portable computer 1 according to embodiments of the present general inventive concept. Referring to FIGS. 2-5, the portable computer 1 may include the interface unit 40 and a main body cable unit 50 to electrically connect the keyboard assembly 30 and the main body connector 15a. The main body cable unit 50 includes a cable connector 51 connected to the main body connector 15a (illustrated in FIG. 2) at one side thereof, and a plurality of main body signal pins 52 connected to an interface unit 40 at the other side thereof.

Hereafter, the interface unit 40 of the portable computer 1 according to the embodiment of the present general inventive concept will be described in more detail with reference to FIG. 3.

The interface unit 40 according to the embodiment of the present general inventive concept may include a plurality of signal pads SP, signal lines SL extended from the respective signal pads SP, a plurality of groups G1, G2, G3, G4, G5, and G6 connected to the respective signal lines SL, and branch pads BP1, BP2, and BP3 split from each of the plurality of groups G1, G2, G3, G4, G5, and G6 to form a plurality of branches of each end of the signal lines SL. Each signal pad SP is electrically connected through the corresponding signal lines SL to the branch pads BP1, BP2, and BP3 in each corresponding group G1, G2, G3, G4, G5 and G6. Each of the branch pads BP1, BP2, and BP3 of each groups G1, G2, G3, G4, G5 and G6 are connected to the signal line corresponding to the groups G1, G2, G3, G4, G5 or G6.

The signal pads SP are spaced apart by a first predetermined interval from one another along an edge (hereinafter, referred to as 'a first edge') of the interface unit 40 parallel to a horizontal direction ('CD' direction) of the keyboard assembly 30. The first edge of the interface unit 40 corresponds to a side of the main circuit substrate 15.

The branch pads BP1, BP2, and BP3 are arranged and spaced apart by a second predetermined interval from one another along an opposite edge (hereinafter, 'a second edge') opposite to the first edge of the interface unit 40 with respect to the signal lines SL. The second edge of the interface unit 40 corresponds to a side of the keyboard assembly 30.

The plurality of the branch pads BP1, BP2, and BP3 may have portions extended and/or split from the end of the respective signal lines SL and are arranged in an oblique line in order to maintain a predetermined spacing interval from the adjacent branch pad. However, this is only an example, the arrangement form and the number of the branch pads BP1, BP2, and BP3 are not limited thereto, the proper form and number of branch pads may vary.

In addition, the branch pads BP1, BP2, and BP3 in each group G1, G2, G3, G4, G5 or G6 can be spaced apart by same intervals from one another. Thus, even when the keyboard signal pins 34 of the keyboard assembly 30 are spaced by the same intervals, only moving the interface unit 40 or the keyboard signal pins 34 of keyboard assembly 30 in the horizontal direction enables the keyboard signal pins 34 of keyboard assembly 30 to easily connect to one of the branch pads BP1, BP2, and BP3 in each group G1, G2, G3, G4, G5 or G6.

Each main body signal pin 52 of the main body cable unit 50 is connected to each signal pad SP of the interface unit 40. The keyboard signal pins 34 of the keyboard assembly 30 are respectively connected to corresponding ones of the branch pads BP1, BP2, or BP3 of the respective groups G1, G2, G3, G4, G5 and G6 in the interface unit 40. The keyboard signal pin 34 or the main body signal pin 52 may be connected and maintained to the branch pads BP1, BP2, or BP3 or signal pad SP, for example, by soldering. As such, in the portable computer 1, the keyboard assembly 30 and the main circuit substrate 15 are electrically connected to one another through the interface unit 40. The signal pad SP can be directly connected to he main body connector 15a with being connected to the main body signal pins 52 of the main body connector 15a.

In addition, although the keyboard cable 33 of the keyboard assembly 30 and the main connector 15a of the main circuit substrate 15 are not positioned on a same line in a direction perpendicular to the CD direction, the keyboard assembly 30 and the main circuit substrate 15 can be stably electrically connected to each other while the keyboard cable 33 or the main cable unit 50 does not bend while in the CD direction, by selectively connecting each keyboard signal pin 34 to one of the branch pads BP1, BP2, and BP3 of the respective groups G1, G2, G3, G4, G5 and G6. That is, the keyboard pins 34 can be connected to the branch pads BP1 when the main body connector 15a is changed in its position with respect to the keyboard cable 33. It is possible that the keyboard pads 34 can be connected to the branch pads BP3 according to the position of the main body connector 15a with respect to the keyboard cable 33. Accordingly, although a mount position of the main body connector 15a is varied by a predetermined distance in the horizontal direction (or CD direction) of the keyboard assembly 30 according to the change of layout of the main circuit substrate 15, the keyboard assembly 30 can still be used without newly manufacturing the keyboard assembly.

Hereafter, an interface unit 40a of the portable computer 1 according to an embodiment of the present general inventive concept will be described in more detail with reference to FIG. 4. In describing the portable computer 1 of FIG. 4, the same reference numbers are attached to the parts which are identical to those of FIG. 3, and a description thereof is omitted.

The interface unit 40a of the portable computer 1 according to the embodiment present general inventive concept, may include a plurality of signal pads SP', the signal lines SL extended from the respective signal pads SP', a plurality of groups G1', G2', G3', G4', G5' and G6' connected to the respective signal lines SL, and branch pads BP1', BP2', and BP3 ' split from each of the plurality of groups G1', G2', G3', G4', G5' and G6' to form a plurality of branches of each end of the signal lines SL. Each of the branch pads BP1', BP2', and BP3 ' of each group G1', G2', G3', G4', G5' and G6' are connected through the corresponding signal line SL to the corresponding signal pads SP'. The branch pads BP1', BP2', and BP3 ' in the interface unit 40a of the portable computer 1 are provided in a different form from the branch pads BP1, BP2, and BP3 in the interface unit 40 of the portable computer 1. However, this is only an example, and various forms of branch pads BP1' to BP3 ' may be provided in the present general inventive concept.

The keyboard signal pins 34 of the keyboard assembly 30 are respectively connected to each signal pad SP' of the interface unit 40a according to the present embodiment of the general inventive concept. Each main body signal pin 52' of the main body cable unit 50 is respectively connected to corresponding ones of the branch pads BP1', BP2', or BP3 ' of each group G1', G2', G3', G4', G5' or G6' of the interface unit 40a. Thus, the same operations and effects can be obtained as those in the previous embodiment of the present general inventive concept.

Hereafter, an interface unit 40b of the portable computer 1 according to an embodiment of the present general inventive concept will be described in more detail with reference to FIG. 5. In describing the portable computer 1 according FIG. 5, the same reference numbers are attached to the parts which are identical to those in FIGS. 3 and 4, and a description thereof is omitted.

The interface unit 40b according to the embodiment of the present general inventive concept may include the signal lines SL, a plurality of first groups G1_1, G1_2, G1_3, G1_4, G1_5, and G1_6 connected to the respective signal lines SL, and first branch pads BP1_1, BP1_2, and BP 1_3 split from each of the plurality of first groups G1_1, G1_2, G1_3, G1_4, G1_5, and G1_6 to form a plurality of first branches of each end on a first side of the signal line SL. A plurality of second groups G2_1, G2_2, G2_3, G2_G4, G2_5, and G2_6 connected to the respective signal lines SL and second branch pads BP2_1, BP2_2, and BP 2_3 split from each of the plurality of second groups G2_1, G2_2, G2_3, G2_G4, G2_5, and G2_6 to form a plurality of second branches of each end on a second side of the signal line SL. Each of the first branch pads BP1_1, BP1_2, and BP1_3 of the first groups G1_1, G1_2 , G1_3, G1_4, G1_5, and G1_6 are electrically connected through each signal line SL to the second branch pads BP2_1, BP2_2, and BP 2_3 in each of the respective second groups G2_1, G2_2, G2_3, G2_G4, G2_5, and G2_6. Each of the first groups G1_1, G1_2, G1_$_3$, $_{G1\_}$4, G1_5, or G1_6 are connected to corresponding second groups G2_1, G2_2, G2_3, G2_G4, G2_5, or G2_6 through the respective signal lines SL.

The keyboard signal pin 34 of the keyboard assembly 30 is connected to any one of the first branch pads BP1_1, BP1_2, or BP1_3 of each group G1_1, G1_2, G1_3, G1_4, G1_5, or G1_6. The main body signal pin 52' of the main body cable unit 50 is connected to one of the second branch pads BP2_1, BP2_2, or BP2_3 of each group G2_1, G2_2, G2_3, G2_4, G2_5, or G2_6.

Thus, although the keyboard cable 33 of the keyboard assembly 30 and the main connector 15a of the main circuit substrate 15 are not positioned on the same line in the direction perpendicular to the CD direction, the keyboard assembly 30 and the main circuit substrate 15 can be stably electrically connected to each other while the keyboard cable 33 or the main body cable unit 50 maintains an unbent state, by selectively connecting the keyboard signal pin 34 of the keyboard assembly 30 to one of the first branch pads BP1_1 to BP1_3 of each group G1_1 to G1_6, and selectively connecting the main body signal pin 52 of the main body cable unit 50 to any one of the second branch pads BP2_1 to BP2_3 of each group G2_1 to G2_6. Accordingly, although the mount position of the main body connector 15a is varied by a predetermined distance in the horizontal direction of the keyboard assembly 30 according to the change of layout of the main circuit substrate 15, the keyboard assembly 30 can still be used without newly manufacturing the keyboard assembly 30.

As described above, according to the present general inventive concept, a portable computer is provided in which a combination of a keyboard assembly and a main circuit substrate to adaptively correspond to a variation of a construction of the keyboard assembly or a layout change of the main circuit substrate received in the main body.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computer having a main body, and a main circuit substrate received in the main body and provided with a main body connector, the portable computer comprising:
an interface unit having a plurality of signal pads, a plurality of signal lines extended from the respective signal pads, and a plurality of groups connected to the respective signal lines, and a plurality of branch pads split from each of the plurality of groups to form a plurality of branches of each end of the signal lines;
a keyboard assembly having a plurality of keyboard signal pins connected to one of either one of the branch pads of each group or the signal pads; and
a main body cable unit of which one side is provided with a cable connector connected to the main body connector, and the other side is provided with main body signal pins connected to the other of either one of the branch pads of each group or the signal pad not connected to the keyboard signal pins.

2. The portable computer according to claim 1, wherein: the signal pads are spaced apart from one another by a first predetermined interval along a first edge of the interface unit parallel to an edge of the keyboard assembly, and
the branch pads are arranged spaced apart from each other by a second predetermined interval along a second edge of the interface unit opposite to the first edge.

3. The portable computer according to claim 2, wherein the branch pads in each of the plurality of groups are arranged to be spaced from each other at same intervals.

4. The portable computer according to claim 1, wherein the keyboard signal pin and/or the main body signal pin are soldered to the signal pads and/or the branch pads.

5. A portable computer having a main body, and a main circuit substrate received in the main body and provided with a main body connector, the portable computer comprising:
an interface unit having a plurality of signal lines, a plurality of first groups connected to a first end of the respective signal lines, a plurality of first branch pads split from each of the first groups to form a plurality of first branches, a plurality of second groups connected to a second end of the respective signal lines, a plurality of second branch pads split from each of the second groups to form a plurality of second branches;
a keyboard assembly provided with a plurality of keyboard signal pins connected to one of the first branch pads of each first group; and
a main body cable unit of which one side is provided with a cable connector connected to the main body connector, and the other side is provided with a plurality of main body signal pins connected to one of the second branch pads of each second group.

6. The portable computer according to claim 5, wherein the first branch pads are arranged to be spaced from each other at a first predetermined interval along a first edge of the interface unit opposite to an edge of the keyboard assembly; and the second branch pads are arranged to be spaced from each other at a second predetermined interval along a second edge of the interface unit opposite to the first edge.

7. The portable computer according to claim 6, wherein the first branch pads in each group are arranged to be spaced from each other in a same interval; and the second branch pads in each group are arranged to be spaced from each other in the same interval.

8. The portable computer according to claim 5, wherein the keyboard signal pin and/or the main body signal pin are soldered to the branch pads of the first and/or the second groups.

9. A portable computer, comprising:
a keyboard having a keyboard cable;
a main circuit substrate having a main body connector to be connected to the keyboard cable; and
an interface unit to connect the main body connector to the keyboard cable when a position of the keyboard cable is not aligned in a same line with a position of the main body connector, the interface unit having:
signal lines; and
signal pads formed on both ends of the signal lines to be connected to the keyboard cable and the main body connector, respectively,
wherein the signal pads are connected to different pins of the main body connector according to a position of the main body connector with respect to the keyboard cable.

10. The portable computer of claim 9, wherein:
the keyboard cable is disposed in a first line, and
the main body connector is disposed in a second line which is spaced apart from the first line.

11. The portable computer of claim 10, wherein the first line is parallel to the second line.

12. The portable computer of claim 9, wherein:
the main body connector comprises a predetermined number of main body signal pins, and
the interface unit comprises a predetermined number of groups of main body branch pads to receive the predetermined number of main body signal pins.

13. The portable computer of claim 12, wherein the predetermined number of groups of main body branch pads corresponds to a predetermined number of positions in which the interface unit can receive the main body unit.

14. The portable computer of claim 13, wherein the keyboard cable is aligned in the same line with the main body connector when the keyboard cable is disposed on a first portion of the keyboard with respect to the main circuit substrate, and the keyboard cable is not aligned in the same line with the main body connector when the keyboard cable is disposed in a second portion of the keyboard with respect to the main circuit substrate.

15. The portable computer of claim 9, further comprising:
a cable connector having a predetermined number of keyboard signal pads to connect the keyboard cable to the interface unit, and
wherein the interface unit comprises a predetermined number of groups, each group having a predermined number of keyboard branch pads to receive the predetermined number of keyboard signal pads in one the keyboard branch pads of each of the groups.

16. The portable computer of claim 15, wherein the predetermined number of key board branch pads corresponds to a predetermined number of positions in which the interface unit can receive the cable connector without bending the keyboard cable in a non bending direction.

17. The portable computer of claim 9, wherein
the signal pads comprise:
first signal pads formed on second ends of the signal lines to be connected to main body connector pins of the main body connector when the main body connector is in a first position with respect to the keyboard cable; and
second signal pads formed on the second ends of the signal lines to be connected to the main body connector when the main body connector is in a second position with respect to the keyboard cable.

18. The portable computer of claim 9, further comprising:
a main body and a display rotatably connected to the main body, and having a lower case to accommodate the main circuit substrate and an upper case to accommodate the keyboard,
wherein the keyboard cable is disposed in one of first and second portions of the keyboard, and the interface unit comprises first and second pads to be connected to the keyboard cable which is disposed in the first and second portions of the keyboard, respectively.

19. The portable computer of claim 9, wherein the interface unit comprises:
signal lines;
signal pads formed on a first end of the signal lines to be connected to main body connector pins of the main body connector;
first signal pads formed on a second end of the signal lines to be connected to keyboard signal pins of the keyboard cable when the main body connector is in a first position with respect to the keyboard cable; and
second signal pads formed on the second end of the signal lines to be connected to the keyboard signal pins of the keyboard cable when the main body connector is in a second position with respect to the keyboard cable.

20. An interface apparatus to electrically connect first and second components in a portable computer, the interface apparatus comprising:
a plurality of signal lines;
signal pads formed on first ends of the signal lines to be connected to a first cable; and
groups formed on second ends of the signal lines, each group having a first signal pad and a second signal pad one of which is connected to a second cable according to a position of the second cable with respect to the first cable.

* * * * *